United States Patent Office 2,983,739
Patented May 9, 1961

2,983,739
PRODUCTION OF COMPOUNDS OF THE BETA-IONYLIDENE-ETHYLIDENE SERIES
Horst Pommer and Wilhelm Sarnecki, Ludwigshafen (Rhine), Germany, assignors to Badische Anilin- & Soda-Fabrik Aktiengesellschaft, Ludwigshafen (Rhine), Germany
No Drawing. Filed Aug. 29, 1958, Ser. No. 757,931
Claims priority, application Germany Sept. 3, 1957
24 Claims. (Cl. 260—410.9)

This invention relates to the production of compounds of the beta-ionylidene-ethylidene series starting from vinyl-beta-ionol.

In recent years, many methods have been described for the synthesis of compounds which contain the beta-ionylidene-ethylidene radical (I):

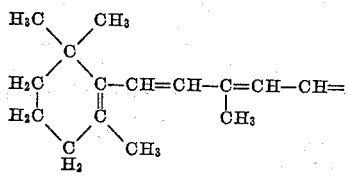

I

The interest in research into the synthesis of compounds of the beta-ionylidene-ethylidene series is not surprising because many natural substances which play an important part in human nutrition and physiology contain this radical (I), as for example many carotenoids, such as beta-carotene and vitamin A.

In the known methods (cf. for example O. Isler, Chimia, vol. 4 (1950) page 116 et seq.; H. H. Inhoffen and F. Bohlmann, Fortschr. chem. Forschung I (1949), pages 175-210; F. Bohlmann, Angew. Chem. 62 (1950), pages 4-7; E. Vogel and H. Knobloch "Chemie und Technik der Vitamine," 3rd edition (1950), vol. 1, pages 18-150; J. S. N. Jones, Chem. Prod. chem. News 13 (1950), page 206; J. G. Baxter, Fortschritte der Chemie org. Naturstoffe, Springer-Verlag, Vienna, vol. 9 (1952), page 78; H. H. Inhoffen and H. Siemer, ibid, pages 1-77; H. O. Huisman and collaborators, Rec. des Trav. Chim. des Pays-Bas, vol. 71 (1952), page 911; N. A. Milas "The vitamins," vol. 1, Academic Press Soc. Publishers, New York (1954), pages 4-58; O. Isler, Angew. Chem. 68 (1956), pages 547-553 and O. Isler and M. Montavon, Chimia 12 (1958), page 1) there are used either the pure beta-isomers of cyclocitral (II) or of ionone (III) or compounds of the general constitution IV or V as initial materials for the synthesis of compounds of the ionylidene-ethylidene series.

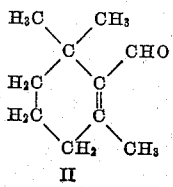
II

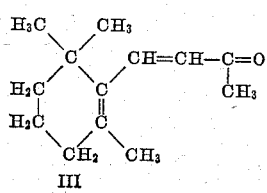
III

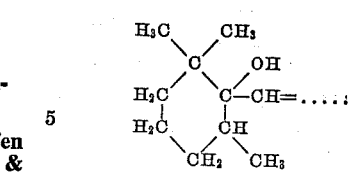
IV

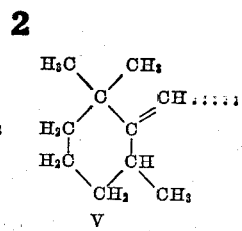
V

Experience has taught that beta-cyclocitral is not an initial material which can be used economically for the synthesis of carotenoids (within the term carotenoids we include here and hereinafter also vitamin A and its functional derivatives) or the preliminary stages of the same. Syntheses of compounds of the types IV and V have also often been described, but for industrial processes they are too troublesome and therefore have not been used in practice.

Recapitulating it can be stated that hitherto the preferred initial material for the synthesis of compounds of the beta-ionylidene-ethylidene series is beta-ionone (III) which is of good accessibility industrially and is produced in large amounts as a perfume (cf. for example the technical synthesis of vitamin A and of beta-carotene, comprehensively referred to by O. Isler in Zeitschrift für Angewandte Chemie 68 (1956), page 547).

The object of this invention is to provide a specially advantageous process for the production of compounds having the radical of beta-ionylidene-ethylidene. A further object of the invention is the production of biologically-active dyestuffs for foodstuffs.

We have found that the above specified compounds can be prepared in an advantageous manner with excellent yields in a very pure form by reacting 5-(2'.6'.6'-trimethylcyclohexene - (1')-yl-(1'))-3-methylpentadiene-(1.4)-ol-(3) (vinyl-beta-ionol) (VI) (cf. for example W. Oroshnik, G. Karmas and A. Melbane, J. Am. Chem. Soc. 74 (1952), page 300) with a triarylphosphine and a proton donor or a hydrosalt of a triarylphosphine on the one hand and with an oxo compound by the agency of a proton acceptor on the other hand.

As proton donors there are especially suitable strong inorganic acids, especially the halogen hydracids and those oxygen acids of sulfur and phosphorus which have no oxidizing or reducing action under the reaction conditions. Furthermore, all acids are suitable which form, with triarylphosphines, salts of the type:

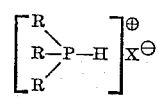

R stands for identical or different aromatic radicals, $X^{\ominus}$ stands for the radical of an inorganic or strong organic acid, for example trichloracetic acid or the benzenesulfonic acids. Reference should be made to the fact that the expression proton donors includes all compounds yielding protons which an expert would recognise as being suitable after becoming aware of the present description.

As proton acceptors there are meant substances which are acid-binding agents or act as acid-binding agents; to this class there belong inorganic bases, for example alkali metal hydroxides, alkaline earth metal hydroxides, alkali and alkaline earth metal amides, ammonia; among organic bases there are suitable for example strongly basic amines, such as piperidine or diethylamine; there are also suitable alkali alkaline earth alcoholates, alkali and alkaline earth ketone enolates, and in many cases also organo-metallic compounds, such as lithium methyl, sodium methyl, phenyl sodium, phenyl lithium, butyl lithium, sodium acetylide, indene potassium and Grignard compounds, such as ethyl magnesium bromide.

Oxo compounds suitable for the process according to this invention are compounds which contain in the molecule at least once a carbonyl group. The term carbonyl group is meant to denote the group

which by its two free valencies is linked to the carbon atoms of two organic radicals or which by one of its valencies is linked, either directly or by way of an oxygen atom, to the carbon atom of an organic radical, the second free valency bearing a hydrogen atom.

As examples of oxo compounds suitable for the reaction the following aldehydes and ketones may be mentioned: formaldehyde, acetaldehyde, propionaldehyde, butyraldehyde, isobutyraldehyde, acrolein, alpha-methacrolein, crotonaldehyde, hexadienal, octatrienal, benzaldehyde, cinnamaldehyde, phenylacetaldehyde, phenylpentadienal, acetone, butyrone, methyl ethyl ketone, citral, cyclocitral, glyoxylic acid, glyoxylic acid esters, glyoxal, glycol aldehyde, etherified and esterified glycol aldehydes, acetoacetic acid esters, oxomalonic acid esters, oxalacetic acid esters, beta-alkoxyacroleins, such as beta-ethoxy-acrolein and alpha-methyl-beta-ethoxyacrolein, alpha-methyl-beta-acetoxyacrolein, alpha-methyl-beta-chloracrolein, vinyl methyl ketone, beta-chlorvinyl methyl ketone, beta-methoxyvinyl methyl ketone, chloracetaldehyde, beta-formyl-acrylic acid, propargylaldehyde, butinone, tetrol aldehyde, maleic dialdehyde, 2.7-dimethyl-octadiene-(2.6)-ine-(4)-dial-(1.8), 2.7-dimethyl-octatriene-(2.4.6)-dial-(1.8), tiglaldehyde, beta-formylcrotyl alcohol, esters of beta-formylcrotyl alcohol, beta-formylcrotonic acid and its esters, 1-alkoxy-3-methyl-butene-(2)-al-(4), 5-carboxy-4-methyl-pentadiene-(2.4)-al-(1), 5-carbalkoxy-4-methyl-pentadiene-(2.4)-al-(1), 5-methoxy-4-methyl-pentadiene-(2.4)-al-(1), 4-methyl-hexadiene-(2.4)-al-(1), 7-carboxy-2.6-dimethyl-heptatriene-(2.4.6)-al-(1), 7-carbalkoxy-2.6-dimethyl-heptatriene-(2.4.6)-al-(1), 8-alkoxy-2.6-dimethyl-octatriene-(2.4.6)-al-(1), 11-carboxy-2.5.10-trimethyl-undecapentaene-(2.4.6.8.10)-al-(1).

The esters of formic acid may also be reacted according to this invention with excellent yields.

As the above enumeration, which is merely for the purpose of explanation and does not in any way limit the scope of the invention, shows, the carbonyl group may bear substituents of the most varied kinds. They may be not only hydrocarbon radicals, but also radicals containing oxygen, sulfur, halogen, nitrogen and/or other atoms; for the expert it will be obvious that the substituents on the carbonyl group must not contain any radicals injurious to the reaction, and it is also obvious that the oxo compounds must not be of such a high molecular weight that they do not dissolve sufficiently under the reaction conditions.

It may be said quite generally that for the reaction according to this invention, those aldehydes and dialdehydes are preferred which contain at least one unsaturated carbon-carbon linkage in conjugation to the carbonyl double linkage and, when they are branched, which preferably bear as the side radicals methyl or also ethyl radicals. The terminal groups of the preferred aldeheydes may be hydrocarbon radicals, or hydroxyl, ether, carboxyl, ester or amino groups. The maximum number of unsaturated carbon-carbon linkages in the preferred aldehydes and dialdehydes should not exceed 8. The total number of carbon atoms in the oxo compounds should not exceed 30, excluding the carbon atoms of any ether, ester or amino radicals present. The term triarylphosphine is intended to include all compounds suitable for the reaction, in the molecule of which three aromatic rings are attached, each to a phophorous atom. As aromatic rings there are to be understood above all benzene rings and benzene rings substituted by hydrocarbon radicals, for example the toluene ring.

The reactions are carried out in organic solvents which are liquid under the reaction conditions. The choice of solvent is largely dependent on the choice of the oxo components and the proton donors and acceptors used; it is not necessary in all cases to exclude the presence of water.

As examples of solvents there may be mentioned: ethers such as diethyl ether, tetrahydrofurane, dimethyltetrahydrofurane, dioxane, hydrocarbons such as benzene, toluene, xylene, cyclohexane, cyclo-octane, iso-octane, alcohols such as methanol, ethanol, isopropanol, butanol and benzyl alcohol. Strongly polar solvents are preferred, for example dimethylformamide, acetonitrile, N-methylpyrrolidone, ethyl acetate, nitrobenzene and methanol. Mixtures of different solvents may also be used.

The reaction temperatures may be varied within wide limits, from about —50° C. to +100° C., and are dependent on the melting or boiling point of the solvent, among other things. In general, it is advantageous to work at temperatures from about 0° C. to about +50° C.

The ratio of the amounts of the initial materials, especially of the vinyl-beta-ionol (VI) to the triarylphosphine and to the proton donor or to the hydrosalt of a triarylphosphine, is advantageously chosen for practical reasons approximately stoichiometrical, as also the oxo compound to be reacted.

If it is desired however to react a dioxo compound on both sides, a deficiency is often favorable. The proton acceptors are also usually employed in equivalent relative amounts, but a multiple of the equivalent may also be advantageous, for example when oxo-carboxylic acids are used as one reaction component or when the proton donor is used in excess.

If vinyl-beta-ionol, triarylphosphine and proton donor are present in the reaction mixture, the oxo compounds and the proton acceptors may be added in any sequence. It is also possible first to bring together vinyl-beta-ionol, oxo compounds and then triarylphosphine and proton donor or, however, also proton donor and triarylphosphine or triarylphosphine-hydrosalt, the proton acceptor being incorporated towards the end.

In many cases the yields may be further improved by protecting the reaction mixture from access of air by a gas which is slow to react or inert, for example nitrogen or argon.

It should be emphasized that the invention is not limited to the choice of certain amounts of initial materials, specific triarylphosphines, specific solvents, temperatures or other particulars ascertainable without inventive aid by an expert after reading this description. The statements contained in this patent description therefore give only some directions for the purpose of explanation, to which however the invention is not limited.

For the explanation of the reaction on which the invention is based, and of which the reaction mechanism has not yet been clarified in every detail, some characteristic reactions will now be explained schematically:

Thus vitamin A acetate (VIII) is obtained by reaction of vinyl-beta-ionol (VI) with beta-formylcrotyl acetate (VII). For the sake of simplicity, triphenylphosphine is always given in the schematic reproduction as the triarylphosphine, hydrochloric acid as the proton donor, sodium methylate as the proton acceptor, and dimethylformamide as the solvent.

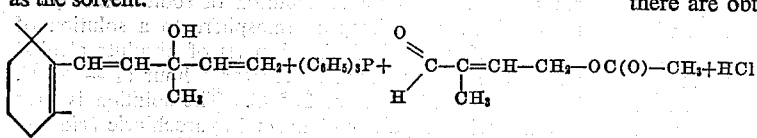

VI    VII

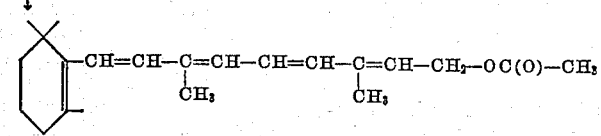

(Dimethylformamide)+NaOCH₃

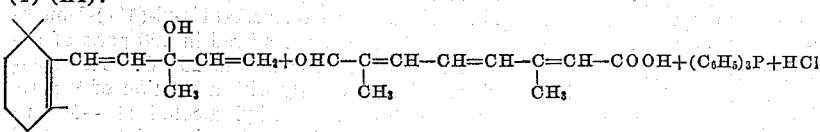

VIII    +(C₆H₅)₃PO+NaCl
        +CH₃OH+H₂O

A valuable non-toxic isoprenoid foodstuff (X) having vitamin A activity is obtained for example from VI and 7-carboxy-2.6-dimethyl-heptatriene-(2.4.6)-al-(1) (IX):

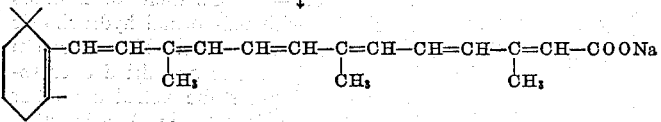

VI    IX (Dimenthylformamide)+2NaOCH₃

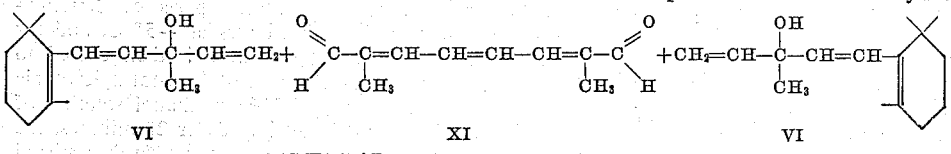

X

By reaction of 2 mols of VI with 1 mol of 2.7-dimethyloctatriene-(2.4.6)-dial-(1.8) (XI) there is obtained beta-carotene (XII) important as provitamin A and as natural dyestuff.

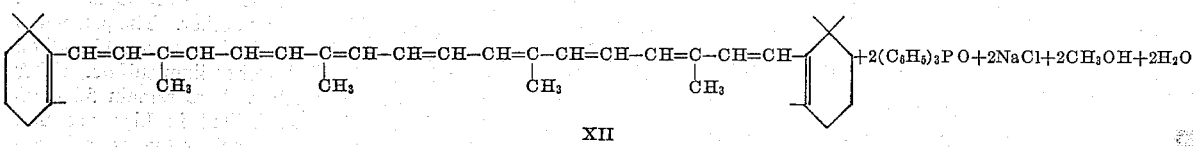

VI    XI    VI

+(C₆H₅)₃P    Dimethylformamide+(C₆H₅)₃P
+HCl         +2NaOCH₃    +HCl

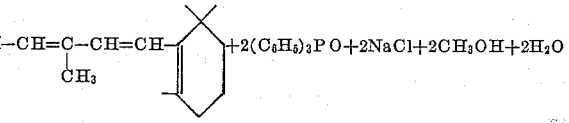 +2(C₆H₅)₃PO+2NaCl+2CH₃OH+2H₂O

XII

By reaction of VI with ethyl formate there is obtained the enol ether of the so-called beta-C₁₆-aldehyde (XIII), an important intermediate product of the beta-carotene synthesis according to O. Isler (cf. Angew. Chem. 68 (1956), page 547) 6-(2'.6'.6'-trimethyl-cyclohexene-(1') - yl - (1')) - 4 - methyl - 1 - ethoxy - hexatriene- (1.3.5). (XIII)

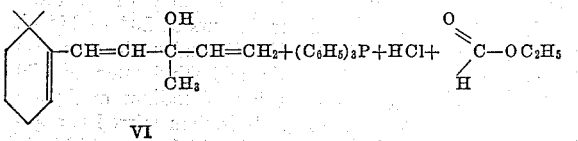

VI (Dimethylformamide)
+NaOCH₃

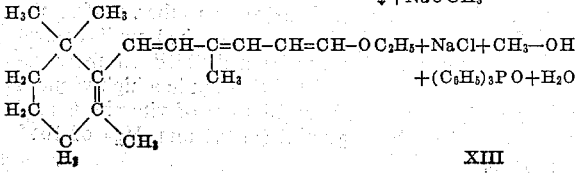 CH=CH—C=CH—CH=CH—OC₂H₅+NaCl+CH₃—OH
                                        +(C₆H₅)₃PO+H₂O

XIII

In general, by the explained and claimed reactions, there are obtained compounds of the all-trans-beta-ionyl- idene-ethylidene series; if all isomerizing influences, such as light, acids or halogens, are avoided during working up, cis-compounds may also be isolated. The relatively

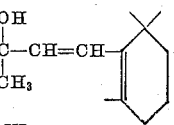

stable compounds of the 9-cis series are never formed in appreciable amounts.

The great technical and economical importance of the compounds of the beta-ionylidene-ethylidene series has already been explained herein and has been underlined by the choice of the compounds reproduced by formulae. The new claimed process can be carried out considerably more simply than those hitherto known. Fewer process stages are required or compounds with the beta-ionyl-idene-ethylidene radical can now be prepared in a single process stage.

A further advantage of the invention is the great purity of the end products, which can readily be obtained in crystalline form. The novelty of the process and its superiority as regards smaller number of stages, better yields and especially the pure and crystalline form of the end products in the all-trans configuration is very clear for example when the new process is compared with those which have become known by the U.S. patent specifications Nos. 2,674,621 and 2,789,131, in which also vinyl-beta-ionol or ethinyl-beta-ionol is used as one initial material. The invention therefore leads to valuable and important advances in industry. It is also very important that the initial material, vinyl-beta-ionol, is readily accessible in a simple way by ethinylation of beta-ionol and partial hydrogenation of the resultant beta-ethinyl-ionol. The advantages of the new process are also especially remarkable when it is compared with the process described in the German patent specification No. 954,247. Apart from the fact that the beta-ionylidene-ethyl alcohol therein described as initial material must be obtained in an expensive and troublesome way, for example from beta-ionone, the further reaction therein specified requires a considerably higher expenditure and only yields the end product, in this case beta-carotene or 15.15'-dehydro-beta-carotene, after troublesome purification methods and even then in smaller yields than in the present process.

The fact that the invention leads to the desired compounds, especially to compounds of the vitamin A series, is especially surprising when it is remembered that vinyl-beta-ionol is extremely sensitive to acids, especially halogen hydracids, and changes almost spontaneously, with the splitting off of water, into the retro compound 5-((2'.6'.6'-trimethylcyclohexene-(2') - ylidene-(1'))-3-methyl-pentadiene-(1.3) (cf. for example H. O. Huisman and collaborators, Rec. Trav. chim. des Pays-Bas, vol. 71 (1952) page 911). The course of the reaction itself, as thorough investigations have shown, is extremely complicated.

The compounds obtainable according to the invention, for example vitamin A and its derivatives, are very active biologically and, by reason of their physiological activity, are valuable pharmaceutical substances and additives for foodstuffs. For example, homo-isopreno-vitamin A acid (X) and also its esters are biologically highly active. They have high vitamin-A activity for example in the rat test. They are especially remarkable for their relatively great stability and their intensity of color which in connection with their non-toxicity and their high bio-affinity makes them applicable as high-quality dyestuffs for foodstuffs. The invention is also important for the production of compounds which are already known because for example beta-carotene and 15.15'-dehydrobeta-carotene have great importance as pharmaceutical substances by reason of their physiological activity; their importance has also increased in recent times because they are required in ever increasing amounts as additives to foodstuffs and as dyestuffs for foodstuffs.

The following examples, which are for the purpose of explanation only, show the special value of the invention for the production of compounds which have the double linkage system of vitamin A and are therefore especially sensitive. The parts specified in the examples are parts by weight except where otherwise stated; parts by volume stand in the same relation to parts by weight as the liter to the kilogram.

*Example 1*

70 parts of triphenylphosphine hydrochloride are stirred for 6 hours at room temperature with 44 parts of 5-(2'.6'.6'-trimethyl-cyclohexene-(1')-yl-(1'))-3-methyl-pentadiene-(1.4)-ol-(3) in 200 parts of absolute ethyl alcohol. The solution is dripped simultaneously with 100 parts of a 31% methanol solution of sodium methylate at —15° C. in a nitrogen atmosphere into a solution of 30 parts of beta-formylcrotonic acid in 50 parts of absolute alcohol. The mixture is stirred for another half an hour at —15° C. and then acidified at +5° C. with 250 parts of 1.5 normal phosphoric acid. The crystals deposited are filtered off, washed with water and methanol and dried in vacuo. 42 parts of crude vitamin A acid of the melting point 170° C. are obtained which after a single recrystallization from methanol show a melting point of 178° C., $\lambda_{max}$ 350 to 351 millimicrons, $\epsilon=42{,}000$.

*Example 2*

70 parts of triphenylphosphine hydrochloride are stirred for 6 hours at room temperature with 44 parts of 5-(2'.6'.6'-trimethyl-cyclohexene-(1')-yl-(1'))-3-methyl-pentadiene-(1.4)-ol-(3) in 150 parts of absolute ethyl alcohol. The solution is added simultaneously with 70 parts of a 31% methanol solution of sodium methylate at —15° C. in a nitrogen atmosphere to a solution of 25 parts of tiglaldehyde in 25 parts of absolute alcohol and the reaction mixture stirred for 1 hour at —15° C. and then for 12 hours at 20° C. The solution is then acidified with 75 parts of 3-normal hydrochloric acid and extracted with petroleum ether. The petroleum ether extract is washed with water until neutral and dried over sodium sulfate. After distilling off the petroleum ether, 40 parts of an oily residue remain which upon cooling in an ice bath solidifies in crystalline form. The crystals are digested with a little acetonitrile and filtered off. The crude axerophthene thus obtained has a melting point of 67° C.; $\lambda_{max}=325$ millimicrons, $\epsilon=45{,}000$ (in cyclohexane) and after a single recrystallization from acetonitrile has a pure melting point: melting point 76° C. $\lambda_{max}=325$ to 326 millimicrons, $\epsilon=50{,}000$.

*Example 3*

70 parts of triphenylphosphine hydrochloride, 44 parts of 5-(2'.6'.6'-trimethyl-cyclohexene-(1')-yl-(1'))-3-methyl-pentadiene-(1.4)-ol-(3) are stirred in 200 parts of absolute alcohol for 3 hours at 20° to 25° C. This solution is dripped simultaneously with a solution of 9 parts of sodium in 100 parts of ethyl alcohol at —30° to —40° C. under nitrogen into a solution of 34 parts of beta-formylcrotonic acid ethyl ester. The mixture is stirred for half an hour at —10° C., then for 2 hours at +20° C., then acidified with 0.2-normal hydrochloric acid and extracted with petroleum ether. The petroleum ether extract is washed until neutral and dried over sodium sulfate. After distilling off the petroleum ether there remain 50 parts of crude vitamin A acid ethyl ester: $\lambda_{max}=352$ millimicrons (in methanol), $\epsilon=30{,}500$.

*Example 4*

68 parts of triphenylphosphine hydrobromide, 44 parts of 5-(2'.6'.6'-trimethyl-cyclohexene-(1')-yl-(1'))-3-methyl-pentadiene-(1.4)-ol-(3) and 150 parts of dimethylformamide are stirred for 2.5 hours at —5° C. and for 16 hours at +20° C. The mixture is then cooled to —40° C. After adding 42 parts of beta-formylcrotonic acid ethyl ester, 36 parts of 31% methanol solution of sodium methylate are dripped in. After 20 minutes, the cooling bath is removed and the mixture further stirred until it has reached a temperature of +10° C. After acidification with 100 parts of 10% sulfuric acid, the solution is extracted with petroleum ether. The petroleum ether extracts are washed neutral with water and sodium bicarbonate solution and dried over sodium sulfate. After distilling off the petroleum ether, there remain 50 parts of an oily residue which is distilled in high vacuum, whereby 33 parts of vitamin A acid ethyl ester is obtained as a yellow oil of the boiling point (0.1 mm. Hg) of 168° to 172° C.; $\lambda_{max}=351$ to 352 millimicrons, $\epsilon=38{,}000$ (methanol).

*Example 5*

70 parts of triphenylphosphine hydrochloride, 44 parts of 5-(2'.6'.6'-trimethyl-cyclohexene-(1')-yl-(1'))-3-methyl-pentadiene-(1.4)-ol-(3) and 200 parts of absolute tetrahydrofurane are stirred for 6 hours at 20° to 25° C. The solution is cooled to —40° C. under nitrogen and 35 parts of beta-formylcrotonic acid ethyl ester and 70 parts of a 31% methanol solution of sodium methylate are dripped in simultaneously. It is then stirred for another half an hour at —30° C. and for 18 hours at 20° C., acidified with 150 parts of 10% phosphoric acid and the acid solution extracted with petroleum ether. After the petroleum ether extract has been washed until neutral and the petroleum ether has been distilled off there remain 45 parts of residue. By distillation in a high vacuum there are obtained therefrom 26 parts of vitamin A acid ethyl ester of the boiling point (at 0.1 mm. Hg) of 165° to 170° C.

Example 6

A solution of 450 parts of hydrogen chloride in 6400 parts of methanol is added at +5° C. while stirring vigorously to 3140 parts of triphenylphosphine, 2640 parts of vinyl-beta-ionol and 800 parts of methanol. The mixture is stirred for another 2 hours at +5° C. and for 20 hours at room temperature. This solution is slowly poured simultaneously with a solution of 800 parts of potassium hydroxide in 4800 parts of methanol at −20° C. into a mixture of 1850 parts of beta-formylcrotonic acid methyl ester and 1800 parts of methanol under a nitrogen atmosphere. The reaction mixture is then brought to a temperature of 0° C. and stirred for another 5 hours. A crystalline precipitate is thereby deposited. It is centrifuged off, washed well with water and dried. There are thus obtained 1860 parts of vitamin A acid methyl ester which after a single recrystallization from a mixture of methanol and acetone has a melting point of 55° C.

The filtrate is again extracted with petroleum ether. The combined petroleum ether extracts are washed neutral with water, filtered off from the precipitate thus deposed and dried over sodium sulfate. After distilling off the petroleum ether there remain 2030 parts of oil as a residue which also consists to the extent of 50% of vitamin A methyl ester and is purified by fractional short distillation; the boiling point (at 0.005 mm. Hg) is 135° C. and the yield is 920 parts.

The total yield amounts to 2780 parts.

Example 7

A solution of 3.7 parts of hydrogen chloride in 80 parts of methanol is dripped at 20° C. into 22 parts of vinyl-beta-ionol and 26 parts of triphenylphosphine. This mixture is stirred for 20 hours and then added under nitrogen at −30° C. simultaneously with a solution of 16 parts of sodium methylate in 45 parts of methanol to a solution of 18 parts of beta-formylcrotonic acid in 40 parts of methanol. Then the cooling is discontinued. As soon as the reaction mixture has reached a temperature of +15° C., 70 parts of a 3-normal aqueous hydrochloric acid are added. After 15 hours the deposited precipitate is removed by filtration. The remainder is well washed with water and dried in vacuo. 14 parts of crude vitamin A acid are obtained.

Another 7 parts of crude vitamin A acid can be obtained in crystalline form from the mother liquor by adding water. The 21 parts of vitamin A acid thus obtained are recrystallized from methanol; 18 parts of pure all-trans-vitamin A acid of the melting point 179° to 180° C. are obtained. $\lambda_{max}$ (methanol) 350 to 351 millimicrons, $\epsilon=43,000$.

Example 8

68 parts of triphenylphosphine hydrobromide, 44 parts of vinyl-beta-ionol and 150 parts of dimethylformamide are stirred for 2 hours at 0° C. and for 10 hours at +20° C. Then 36 parts of 2.6-dimethyloctatriene-(2.4.6)-al-(1)-acid-(8) (obtained by saponification of the ethyl ester, melting point from a mixture of water and methanol, 193° to 194° C.) (cf. British patent specification No. 784,628) are added, stirred until dissolution at moderately raised temperature and then cooled to 0° C. There is then rapidly added 100 parts of a solution of 25 parts of sodium methylate in methanol. A vigorous reaction ensues which is moderated by cooling. The whole is stirred for another 30 minutes, cooled to 0° C. and acidified dropwise with 10% sulfuric acid until the congo-acid reaction is obtained. Homo-iso-preno-vitamin A acid thereby separates in crystalline form. It is filtered off by suction, washed with water and recrystallized from isopropanol. Orange-red needles of the melting point 180° to 181° C. $\lambda_{max}$ 408 millimicrons, $\epsilon=55,000$. The yield amounts to 51 parts.

Example 9

70 parts of triphenylphosphine hydrochloride are stirred for 6 hours at +25° C. with 44 parts of vinyl-beta-ionol in 150 parts of absolute alcohol. Then 36 parts of 2.6-dimethyl-octatriene-(2.4.6)-al-(1)-acid-(8) dissolved in 100 parts of isopropanol are added and while cooling to 0° C. 100 parts of a solution of 18 parts of sodium hydroxide in ethanol are added rather quickly. When the vigorous reaction has subsided, the whole is stirred for another hour, cooled to 0° C. and the procedure of Example 8 followed. The yield amounts to 42 parts.

Example 10

220 parts of vinyl-beta-ionol and 300 parts of triphenylphosphine hydrochloride are suspended in 400 parts of dimethylformamide and stirred for 12 hours at +10° C. From two separate reservoirs there are then dripped into the clear solution simultaneously 174 parts of a 30% methanol solution of sodium methylate and a solution of 160 parts of gamma-acetoxy-alpha-methylcrotonaldehyde (boiling point at 15 mm. Hg 95° to 97° C.) in 110 parts of dimethylformamide. The reaction solution is kept between −5° and −10° C. by cooling. It is stirred for another 5 hours at 0° C. and acidified with dilute phosphoric acid. The pale yellow oily suspension is then extracted with petroleum ether. The petroleum ether extract is washed with water, dried with sodium sulfate, filtered and the filtrate concentrated to a volume of about 400 parts. This petroleum ether extract is filtered through an aluminum oxide column (activity 2 to 3 according to Brockmann). The filtrate is freed from petroleum ether under nitrogen in vacuo and from low boiling constituents in a short path distillation plant at 70° C. and 0.0001 mm. Hg. The residue remaining amounts to 150 parts and shows $\lambda_{max}$ 324 and 325 millimicrons, $\epsilon=33,000$ (isopropanol). The vitamin A acetate concentrate thus obtained can be further purified by chromatographic adsorption. 50 parts are dissolved in 75 parts of hexane and chromatographed on aluminum oxide (activity 3 to 4 according to Brockmann). After a first runnings consisting mainly of unreacted initial material, pure all-trans vitamin A acetate is eluted and this partly crystallizes upon being allowed to stand in a little methanol at +5° C. Melting point 57° to 58° C. $\lambda_{max}$ 325 millimicrons, $\epsilon=47,000$ (isopropanol). The yield amounts to 32 parts.

Example 11

220 parts of vinyl-beta-ionol, are dissolved in 700 parts of dimethylformamide and, after the addition of 330 parts of triphenylphosphine hydrobromide, stirred for 36 hours at room temperature while leading nitrogen thereover. After adding 100 parts of alpha-methyl-acrolein, it is cooled to 0° C. and a solution of 54 parts of sodium methylate in 180 parts of methanol are dripped in quickly. It is stirred for another 3 hours at room temperature, covered with petroleum ether and 150 parts of a 10% phosphoric acid added. After thorough mixing, the pale yellow colored petroleum ether solution is separated. This measure is repeated three times, the combined petroleum ether solutions washed well several times with water and dried at −5° C. for 5 hours over sodium sulfate. It is distilled after filtration. 167 parts of 8-(2'.6'.6'-trimethyl-cyclohexene-(1')-yl-(1'))-2.6-dimethyl-octatetraene-(1.3.5.7) of the boiling point (at 0.05 mm. Hg) of 134° to 138° C. are abtained; $\lambda_{max}$ (hexane) 319 millimicrons, $\epsilon=44,000$; as a pale yellow very autoxidizable oil.

Example 12

110 parts of 5-(2'.6'.6'-trimethyl-cyclohexene-(2')-ylidene-(1')-3-methyl-pentadiene-(1.3) are stirred in 200 parts of dimethylformamide with 140 parts of tritolylphosphine for 36 hours at room temperature; then 18 parts of hydrogen chloride dissolved in 100 parts of methanol (HCl content titrimetrically determined) are added and stirred for 3 hours. A clear solution forms which after the addition of 40 parts of ethyl formate is cooled to 0° C. and a solution of 30 parts of sodium methylate in 100 parts of methanol rapidly added. It is stirred for another 12 hours at room temperature, covered with 250 parts of petroleum ether and a procedure analogous to that in Example 11 followed.

52 parts of 6-(2'.6'.6'-trimethyl-cyclohexene-(1')-yl-(1))-1-ethoxy-4-methyl-hexatriene-(1.3.5) of the boiling point (at 0.05 mm. Hg) of 110° to 113° C. are obtained

Example 13

150 parts of triphenylphosphine hydrochloride are added to 110 parts of vinyl-beta-ionol and, after the addition of 200 parts of dimethylformamide, stirred for 48 hours at room temperature. The clear solution is cooled to +5° C. and there are dripped in separately a solution of 60 parts of alpha-methyl-beta-ethoxy-acrolein in 60 parts of dimethylformamide and a solution containing 28 parts of sodium methylate in 90 parts of methanol. It is stirred for 5 hours at room temperature, covered with 150 parts of benzene, then 100 parts of water are added and the benzene layer is separated. The aqueous phase is extracted with petroleum ether several times. The combined benzene and petroleum ether solutions are washed with water, dried for 12 hours over sodium sulfate and filtered through a small aluminum oxide column (standardized according to Brockmann). The filtrate is distilled under a high vacuum.

65 parts of 8-(2'.6'.6'-trimethyl-cyclohexene-(1')-yl-(1')-2.6-dimethyl-1-ethoxy-octatetraene-(1.3.5.7) of the boiling point (at 0.001 mm. Hg) of 135° to 140° C. are obtained.

Example 14

110 parts of vinyl-beta-ionol are dissolved in 250 parts by volume of dimethylformamide and 135 parts of triphenyl-phosphine are introduced and stirred until clear solution takes place. After cooling to 0° C., 150 parts by volume of methanol in which 18 parts of hydrogen chloride gas are dissolved are dripped in and stirred for 8 hours at 0° C. Then 60 parts of alpha-methyl-gamma-ethoxy-crotonaldehyde (prepared by reaction of ethoxyglycolaldehyde diethyl acetal with propylene ethyl ether in the presence of zinc chloride and acid hydrolysis of the reaction product colorless oil having a somewhat pungent odor, boiling point (at 15 mm. Hg) 74° to 78° C.) are added and a solution of 35 parts of sodium ethylate dissolved in 100 parts of ethanol is dripped in fairly quickly. It is stirred for 30 minutes at room temperature and 100 parts by volume of 10% sulfuric acid are added. The reaction product is isolated by extraction with petroleum ether. The petroleum ether solution is washed with water, dried over sodium sulfate and filtered through a column of aluminum oxide (400 parts) (activity 3 according to Brockmann). From the filtrate that fraction is collected which gives a pure cornflower blue color with antimony chloride in chloroform in the spot test. After evaporating the solvent in vacuo, a golden yellow viscous oil is obtained which consists of vitamin A ethyl ether. $\lambda_{max}$ 325 millimicrons (hexane); $\epsilon=31,000$. Yield 47 parts.

Example 15

110 parts of vinyl-beta-ionol are dissolved in 250 parts by volume of dimethylformamide and, after the addition of 150 parts of triphenylphosphine hydrochloride, stirred for 8 hours at +5° C. 24 parts of sodium acetylide are added, cooled to —5° C. and stirred for 48 hours at this temperature. The solution becomes deep violet in color. Then 70 parts of beta-formylcrotonic acid methyl ester dissolved in 100 parts of dimethylformamide are added and stirred for 12 hours at room temperature. It is covered with petroleum ether, 150 parts by volume of 10% phosphoric acid are added and the dark yellow petroleum ether solution is separated. The phosphoric acid solution is extracted several times with petroleum ether and, after washing with water, dried over sodium sulfate. The petroleum ether is distilled off in vacuo and the residue distilled in high vacuum. 95 parts of all-trans vitamin A acid methyl ester of the boiling point (at 0.001 mm. Hg) of 138° to 142° C. are obtained. $\lambda_{max}$ (methanol) 351 to 352 millimicrons, $\epsilon=36,000$.

Example 16

70 parts of triphenylphosphine hydrochloride, 44 parts of 5-(2'.6'.6' - trimethyl - cyclohexene - (1') - yl - (1')-3-methyl-pentadiene-(1.4)-ol-(3) and 150 parts of methanol are stirred for 10 hours at about 20° C. The pale yellow solution is cooled to —15° C. and into it are dripped under nitrogen from two separate dropping funnels simultaneously 70 parts of a 31% methanol solution of sodium methylate and a solution of 34 parts of gamma-acetoxy-alpha-methylcrotonaldehyde in 50 parts of methanol. It is stirred for another 2 hours at —10° C. and 12 hours at about 20° C. The dark reaction solution is acidified with 75 parts of 3-normal hydrochloric acid and extracted with petroleum ether. The petroleum ether extract is washed neutral with water and dried over sodium sulfate. The pale yellow petroleum ether solution is then concentrated in a current of nitrogen after adding 0.3 part of alpha-tocopherol, to about 150 parts by volume and filtered through a small aluminum oxide column (activity 2 to 3 according to Brockmann). The filtrate is freed from petroleum ether in vacuo. Low boiling constituents are distilled off in a short parth distillation plant at 0.0001 mm. Hg and about 65° to 70° C. The residue amounts to 71 parts and shows $\lambda_{max}$ 324 to 325 millimicrons, $\epsilon=31,500$ (isopropanol). For further purification, the vitamin A acetate concentrate thus obtained is dissolved in 60 parts of hexane and chromatographed on aluminum oxide (activity 3 to 4 according to Brockmann). After a first runnings, which consists mainly of the dehydration product of vinyl-beta-ionol, pure all-trans vitamin A acetate is eluted and it partly crystallizes upon being left to stand in a little methanol at +5° C. Melting point 57° to 58° C., $\lambda_{max}$ 325 millimicrons, $\epsilon=48,000$ (isopropanol).

Example 17

360 parts of triphenylphosphine hydrochloride, 220 parts of 5-(2'.6'.6'-trimethyl-cyclohexene-(1')-yl-(1'))-3-methyl-pentadiene-(1.4)-ol-(3) and 800 parts of methanol are stirred for 90 hours at room temperature. This solution is dripped simultaneously with 370 parts of 6.2-normal methanolic caustic potash under nitrogen into a solution, cooled to —40° C., of 150 parts of beta-formyl-crotonic acid ethyl ester in 160 parts of methanol. It is stirred for another 45 minutes at —30° C. and for 4 hours at room temperature. Then 400 parts of petroleum ether are added and the precipitate thrown down is filtered off. The filtrate has 500 parts of water added to and it and is extracted with petroleum ether. The combined petroleum ether extracts are washed neutral with water, 5% sulfuric acid and sodium carbonate solution and dried over sodium sulfate. After distilling off the petroleum ether there remain 220 parts of crude vitamin A acid ethyl ester as a yellow oil in the residue. $\lambda_{max}=353$ millimicrons (in methanol); $\epsilon=29,600$.

Example 18

52 parts of triphenylphosphine and 52 parts of vinyl-beta-ionol are mixed and dripped at +5° C. under a nitrogen atmosphere into 150 parts by volume of a 1.4-normal methanolic sulfuric acid. It is stirred for 10 hours at room temperature, 45 parts of beta-formyl-crotonic acid butyl ester dissolved in 60 parts of methanol added and 200 parts by volume of a 3-normal methanolic ammonia solution dripped in at 0° C. After stirring for 40 hours at room temperature, it is continuously extracted with petroleum ether until the extract gives no color reaction with Carr-Price reagent. The petroleum ether extract is washed well with water, dried over sodium sulfate and the petroleum ether distilled off in vacuo. There are obtained 38 parts of crude vitamin A acid butyl ester; $\lambda_{max}$ 353 millimicrons, $\epsilon=16,000$. A sample is subjected to alkaline saponification and yields all-trans vitamin A acid of the melting point 179° to 180° C. (from cyclohexane).

*Example 19*

45 parts of vinyl-beta-ionol, 51 parts of triphenylphosphine and 70 parts of methanol are mixed and at +10° to +12° C. dripped into 150 parts by volume of a 1.3-normal methanolic solution of para-toluenesulfonic acid. It is stirred for 24 hours at room temperature, 25 parts of beta-formylcrotonic acid methyl ester added and then 18 parts of piperidine added. An exothermic reaction takes place and after it has ceased the whole is stirred for another 8 hours at room temperature. 45 parts of water are added to the reaction solution and it is continuously extracted with petroleum ether. The petroleum ether extract is washed with water, dried over sodium sulfate and the solvent evaporated in vacuo. The residue consists of vitamin A acid methyl ester, boiling point (at 0.005 mm. Hg) 150° to 155° C. Yield 17 parts.

*Example 20*

225 parts by volume of 1.4-normal methanolic hydrochloric acid are dripped at 0° C. into a mixture of 70 parts of vinyl-beta-ionol and 78 parts of triphenylphosphine. The mixture is stirred for 5 hours at room temperature and then dripped simultaneously with a suspension of 12 parts of calcium hydroxide in 90 parts of methanol at −25° C. into a solution of 45 parts of beta-formylcrotonic acid methyl ester in 50 parts of methanol. The reaction solution is stirred for another 16 hours at room temperature and then extracted several times with petroleum ether. The combined petroleum ether extracts are washed with water and dried over sodium sulfate. After distilling off the petroleum ether, 30 parts of crude vitamin A acid methyl ester remain behind as an oily residue. $\lambda_{max}=354$ millimicrons, $\epsilon=19,200$.

*Example 21*

100 parts of vinyl beta-ionol are dissolved in 250 parts of dimethylformamide, 200 parts of triphenylphosphine hydroiodide (prepared from triphenylphosphine and hydroiodic acid) added and stirred for 4 hours at +5° C. A solution of 50 parts of glyoxylic acid ethyl ester in 50 parts by volume of dimethylformamide is added, cooled to 0° C. and 87 parts by volume of a 30% solution of sodium methylate in methanol quickly added. It is stirred for another 5 hours at room temperature, 100 parts by volume of a 10% phosphoric acid solution added and extracted exhaustively with petroleum ether. The petroleum ether solution is washed with water, with 5% sodium thiosulfate solution and again with water. After drying over sodium sulfate, the petroleum ether is distilled off in vacuo and the residue fractionated in a high vacuum. 60 parts of 7-(2'.6'.6'-trimethyl-cyclohexene - (1') - yl - (1')) - 5 - methyl - heptatriene-(2.4.6)-acid-(1) ethyl ester of the boiling point (at 0.05 mm. Hg) of 110° to 112° C. are obtained.

*Example 22*

110 parts of vinyl-beta-ionol and 180 parts of triphenylphosphine hydrobromide are suspended in 200 parts of ethyl acetate and stirred at room temperature for 20 hours. Without isolating the deposited precipitate, the ethyl acetate is distilled off and the partly crystalline residue suspended in 250 parts by volume of absolute ether. The suspension is cooled to 0° C. and while stirring powerfully a solution of 60 parts of lithium phenyl in 250 parts by volume of absolute ether is slowly introduced. The deep violet turbid ethereal solution then has added to it a solution of 30 parts of glycol aldehyde in 80 parts of absolute benzene. A vigorous exothermic reaction takes place and the violet color disappears to a large extent. It is stirred for another 5 hours and poured onto ice and excess 10% phosphoric acid. The ethereal solution is separated, washed with water and, after drying over sodium sulfate, freed from solvent in vacuo. The residue is suspended in 20 parts by volume of petroleum ether, allowed to stand for 12 hours at −5° C., filtered from the separated triphenylphosphine oxide and the filtrate distilled. At the boiling point (at 0.001 mm. Hg) of 120° C., 48 parts of 7-(2'.6'.6'-trimethylcyclohexene - (1') - yl - (1')) - 5 - methyl - heptatriene-(2.4.6)-ol-(1) are obtained. The beta-anthraquinone carboxylic acid ester of this alcohol prepared in the usual way forms yellow crystals (from acetone) of the melting point 152° to 154° C.

*Example 23*

110 parts of vinyl-beta-ionol and 180 parts of triphenylphosphine hydrobromide are suspended in 200 parts of acetonitrile and stirred for 5 hours at room temperature until a clear solution has been formed. The acetonitrile is distilled off in vacuo and the syrupy residue suspended in 200 parts by volume of benzene. A solution of 65 parts of ethyl magnesium bromide in 200 parts of absolute ether is dripped into this suspension at +5° C. It is stirred for 36 hours at room temperature and then a solution of 60 parts of tiglaldehyde in 60 parts of benzene is added. After standing overnight, it is poured onto ice and excess phosphoric acid and the reaction product isolated in the known manner. 105 parts of axerophthene of the boiling point (at 0.001 mm. Hg) of 132° to 135° C. are obtained.

*Example 24*

55 parts of vinyl-beta-ionol and 90 parts of triphenylphosphine hydrobromide are suspended in 200 parts of acetonitrile and stirred until a clear solution has formed. Then the acetonitrile is evaporated in vacuo and the viscous oily residue suspended in absolute benzene. To this suspension there is added a suspension of finely powdered sodamide (15 parts) in benzene. In an argon atmosphere while excluding moisture, it is stirred for 48 hours at room temperature. The cloudy violet suspension is then filtered under argon and 30 parts of beta-formylcrotonic acid methyl ester dissolved in 50 parts by volume of benzene are added to the filtrate. It is stirred for 5 hours and then poured onto ice and excess phosphoric acid and the vitamin A acid methyl ester formed is isolated in known way. The yield amounts to 22 parts.

*Example 25*

140 parts of triphenylphosphine hydrochloride and 88 parts of 5-(2'.6'.6'-trimethyl-cyclohexene-(1')-yl-(1'))-3-methyl-pentadiene-(1.4)-ol-(3)-(vinyl - beta - ionol) in 400 parts of absolute alcohol are stirred for 6 hours at room temperature. The resultant solution is slowly added, simultaneously with 200 parts by volume of a 31% solution of sodium methylate in methanol, to a solution of 22 parts of all-trans-2.7-dimethyl-octatriene-(2.4.6)-dial-(1.8) dissolved in 300 parts by volume of dimethylformamide. The reaction temperature is kept between +5° and +10° C. by cooling. When all has been added, it is stirred for another hour at room temperature and then the precipitated beta-carotene is filtered off by suction. 27 parts of all-trans-beta-carotene are obtained which after a single recrystallization from a mixture of benzene and alcohol is melting point pure; melting point 179° to 180° C.; $\lambda_{max}$ (in hexane) 452 millimicrons ($\epsilon=149,000$) and 481 millimicrons ($\epsilon=137,000$). From the mother liquor there can be isolated another 5 parts of all-trans-beta-carotene by adding dilute mineral acid, extracting with benzene and boiling the benzene solution with a little iodine for 6 hours under reflux. The dark red benzene solution is then washed with water, with dilute sodium thiosulfate solution and again with water and concentrated to about 20 parts by volume. By adding a mixture of methanol and ethanol (4:1), all-trans-beta-carotene precipitates on standing. The total yield amounts to 32 parts.

*Example 26*

140 parts of triphenylphosphine hydrochloride are stirred for 5 hours at 25° C. with 88 parts of vinyl-beta-ionol in 400 parts of absolute alcohol. This solution is allowed to flow slowly, simultaneously with a solution of 18 parts of metallic sodium in 200 parts of absolute ethanol, into a solution of 22 parts of 4-cis-2.7-dimethyl-octatriene-(2.4.6)-dial-1.8 in 200 parts of dimethylformamide. The reaction temperature is kept at +5° C. After stirring for 3 hours in the dark, especially with the exclusion of sunlight, it is filtered by suction. 18 parts of 15.15′-cis-beta-carotene are obtained as red needles which after recrystallization from a mixture of benzene and methanol melt at 150° C. $\lambda_{max}$ in hexane 338 millimicrons ($\epsilon$=50,000) and 449 millimicrons ($\epsilon$=76,000). From the mother liquor, after treatment analogous to that described in Example 25, another 17 parts of all-trans-beta-carotene are obtained having the melting point 179° C.

*Example 27*

136 parts of triphenylphosphine hydrobromide, 88 parts of vinyl-beta-ionol and 300 parts of dimethylformamide are stirred for 2.5 hours at −5° C. and for 16 hours at +20° C. Then 25 parts of 2.7-dimethyl-octatriene-(2.4.6)-dial-(1.8) are added and stirred until a clear solution has been formed. Without external cooling there are then rapidly added 108 parts by volume of a 31% solution of sodium methylate in methanol while stirring powerfully. A vigorous reaction takes place and the temperature in the reaction vessel rises to 50° C. It is stirred for another hour without cooling and is then cooled to 0° C. The beta-carotene formed crystallizes out and is filtered off by suction. It is washed with a mixture of alcohol and methanol (about 1:3). The beta-carotene crystals containing some inorganic salt are recrystallized from a mixture of benzene and methanol. 42 parts of pure all-trans-beta-carotene of the melting point 179° to 180° C. are thus obtained. Some further beta-carotene crystallizes from the mother liquor. After a treatment analogous to that described in Example 25 another 12 parts of pure all-trans-beta-carotene are obtained. The total yield amounts to 54 parts.

*Example 28*

136 parts of triphenylphosphine hydrobromide, 88 parts of vinyl-beta-ionol and 300 parts of dimethylformamide are stirred for 3 hours at 0° C. and for 12 hours at room temperature. Then 25 parts of 2.7-dimethyl-octadiene-(2.6)-ine-(4)-dial-(1.8) are added and stirred until solution has taken place. With powerful stirring there are then quickly introduced 108 parts by volume of a 31% solution of sodium methylate in methanol. The reaction temperature rises to 50° C. It is stirred until cold and 500 parts of a mixture of ethanol and methanol (1:3) added and allowed to stand for 5 hours at 0° C. The 15.15′-dehydro-beta-carotene which has crystallized out is filtered off by suction and recrystallized from a mixture of benzene and methanol; vermilion red leaflets, melting point 154° C., $\lambda_{max}$ (hexane) 433 to 434 millimicrons ($\epsilon$=115,000) and 457 to 459 millimicrons ($\epsilon$=93,000); the yield amounts to 39 parts. Further amounts of 15.15′-dehydro-beta-carotene may be recovered from the mother liquor.

In the examples, almost only the use of triphenylphosphine and its salts has been illustrated because this simplest of the triarylphosphines can be prepared especially simply. The invention is however not limited to triphenylphosphine, because the other triarylphosphines, above all the trialkylarylphosphines, are readily accessible and can be used in the reactions described in the examples and in other reactions according to this invention with success. Trialkylarylphosphines are phosphines of aryl radicals, especially phenyl radicals, which are substituted by lower alkyl radicals, as for example methyl or ethyl radicals.

We claim:

1. A process for the production of compounds having the radical of beta-ionylidene-ethylidene wherein 5-(2′.6′.6′ - trimethyl-cyclohexene-(1′)-yl-(1′))-3-methyl-pentadiene-(1.4)-ol-(3), also known as vinyl-beta-ionol, and having the formula:

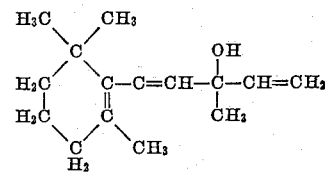

is reacted with a triarylphosphine selected from the group consisting of triphenylphosphine and tri(alkyl-substituted)-phenylphosphine and a proton donor on the one hand and with an oxo compound with the agency of a proton acceptor on the other hand.

2. A process according to claim 1 wherein the proton donor is combined with said triarylphosphine to form a hydrosalt of triarylphosphine.

3. A process according to claim 1 wherein the oxo compound is an ester of formic acid and a member selected from the group consisting of an aliphatic hydroxyl compound containing 1 to 8 carbon atoms and an aromatic hydroxyl compound containing 6 to 8 carbon atoms.

4. A process as claimed in claim 1 wherein the oxo compound is an aliphatic ketone.

5. A process according to claim 1 wherein the oxo compound is an aliphatic aldehyde.

6. A process according to claim 1 wherein the oxo compound is an aliphatic compound which has an unsaturated carbon-carbon linkage at least in alpha-beta-position.

7. A process according to claim 1 wherein the oxo compound is a conjugated unsaturated oxo compound.

8. A process according to claim 1 wherein the oxo compound is a dialdehyde.

9. A process according to claim 6 wherein the aliphatic compound having an unsaturated carbon-carbon linkage at least in the alpha-beta-position is a dialdehyde.

10. A process according to claim 7 wherein the conjugated unsaturated oxo compound is a dialdehyde.

11. A process according to claim 1 wherein the proton donor used is an inorganic acid.

12. A process according to claim 1 wherein an inorganic base is used as the proton acceptor.

13. A process according to claim 1 wherein an organometallic compound is used as the proton acceptor.

14. A process according to claim 1 wherein the reaction is carried out in a strongly polar solvent which is selected from dimethylformamide, acetonitrile, methanol, ethyl acetate and nitrobenzene.

15. A process according to claim 1 wherein the reaction is carried out at a temperature between −20° C. and +30° C.

16. A process as claimed in claim 1 wherein the oxo compounds is an aldehyde of the general formula:

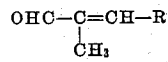

in which R represents one of the following groups: a $CH_2OH$-group, a $CH_2OH$-group which has been esterified with an organic acid having 1 to 8 carbon atoms, a $CH_2OH$-group which has been etherified with a hydroxyl compound having 1 to 8 carbon atoms, a COOH-group, a COOH-group which has been esterified with a hydroxyl compound having 1 to 8 carbon atoms, a CH₃-group.

17. A process according to claim 1 wherein the oxo compound is a conjugated unsaturated compound containing at least one methyl group as a side radical in the aliphatic chain.

18. A process acording to claim 17, wherein the aliphatic chain of the oxo compound contains 4 to 30 carbon atoms.

19. A process according to claim 1 wherein a hydrogen halide is used as the proton donor.

20. A process according to claim 2 wherein the hydrosalt of said triarylphosphine is the salt of an inorganic acid.

21. A process according to claim 1 wherein the oxo compound is 2.6-dimethyl-octatriene-(2.4.6)-al-(1)-acid-(8).

22. A process according to claim 1 wherein the oxo compound is an ester of 2.6-dimethyl-octatriene-(2.4.6)-al-(1)-acid-(8) with a hydroxyl compound having 1 to 8 carbon atoms.

23. A process according to claim 1 wherein the oxo compound is 2.7-dimethyl-octatriene-(2.4.6)-dial-(1.8).

24. A process according to claim 1 wherein the oxo compound is 2.7-dimethyl-octadiene-(2.6)-ine-(4)-dial-(1.8).

No references cited.